No. 862,718. PATENTED AUG. 6, 1907.
D. W. DAVIS.
COMBINED ROLLER, HARROW, AND DRAG.
APPLICATION FILED APR. 29, 1907.

Doras W. Davis
INVENTOR.

WITNESSES:

By C.A. Snow & Co.
ATTORNEYS

UNITED STATES PATENT OFFICE.

DORAS W. DAVIS, OF CHENEY, KANSAS.

COMBINED ROLLER, HARROW, AND DRAG.

No. 862,718.  Specification of Letters Patent.  Patented Aug. 6, 1907.

Application filed April 29, 1907. Serial No. 370,895.

*To all whom it may concern:*

Be it known that I, DORAS W. DAVIS, a citizen of the United States, residing at Cheney, in the county of Sedgwick and State of Kansas, have invented a new and useful Combined Roller, Harrow, and Drag, of which the following is a specification.

This invention has relation to combined rollers, harrows and drags and it consists in the novel construction and arrangement of its parts as hereinafter shown and described.

The object of the invention is to provide an implement of the character indicated which may be used to advantage for preparing the soil for the reception of the seed. It is provided with elements which may be used to roll, harrow and drag the soil at one operation or may be so arranged as to drag and roll or roll and harrow the soil as conditions may require.

Figure 1:
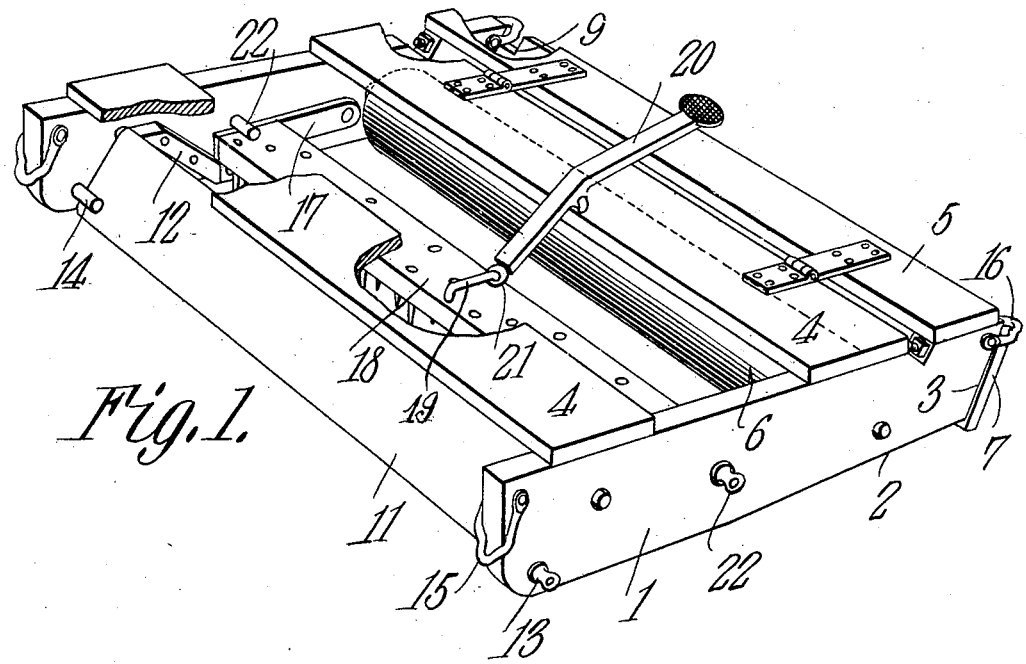
Figure 2:
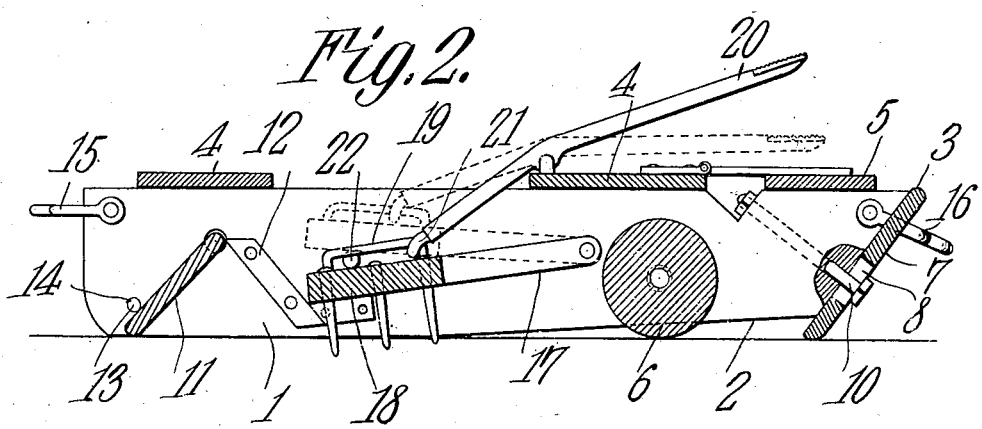

In the accompanying drawing:—Figure 1 is a perspective view of the implement with parts broken away, and Fig. 2 is a longitudinal sectional view of the implement.

The implement consists of the runners 1, the lower edges of which are cut away at their rear portions as at 2 and their rear ends are forwardly inclined toward their lower edges as at 3. The runners 1 are connected together by the cross bars 4 which are secured at their end portions to the upper edges of the said runners. The said cross bars are spaced from each other and the cross bar 5 is hinged to the rear edge of the rear cross bar 4 and rests at its ends upon the upper edges of the runners 1. The roller 6 is journaled between the rear portions of the runners 1 and the lower edge of its periphery extends below the cutaway portions 2 and is substantially in horizontal alinement with the forward portions of the lower edges of the runners 1. The plate 7 is provided at its ends with the elongated openings 8 which are disposed at right angles to the longitudinal axis of the said plate. The plate is provided at its upper corners with the recesses 9 which are in alinement with the upper edges of the runners 1. The bolts 10 pass diagonally through the rear ends of the runners 1 and enter the elongated openings 8 of the plate 7. By means of the said bolts 10 the plate 7 may be shifted up or down along the inclined ends 3 of the runners and fixed in such adjusted position. The plate 11 is pivoted between the runners 1 near the forward ends of the same and may swing toward either end of the runners. The rearward swing of the said plate 11 is limited by the stops 12 which are attached to the inner sides of the runners and which are located in the path of the said plate. The swing of the plate 11 toward the forward end of the runners may be limited by the pins 13 passing through perforations 14 in the runners 1 and which project into the path of the said plate. The clevises 15 are pivoted to the forward ends of the runners 1 and the clevises 16 are pivoted to the rear end of the runners 1 and are adapted to enter the recesses 9 of the plate 7. The links 17 are pivoted to the inner sides of the runners 1 at points between the roller 6 and the plate 11 and are disposed toward the said plate. The harrow section 18 is attached to the forward ends of the links 17 and is provided upon its top with a bail 19. The foot lever 20 is fulcrumed to the rear cross bar 4 and is provided with an eye 21 which engages the bail 19. The pins 22 may be passed transversely through the runners 1 and projected into the path of the harrow section 18 and limit the upward movement of the same or by depressing the lever 20 the said harrow section may be elevated and the pins 22 passed through the runners 1 under the said section and upon which the said section may rest whereby it is held elevated above the ground.

From the foregoing description it is obvious that the implement may be used as a combined roller, harrow and drag and that the draft animals may be hitched to either end of the implement. By elevating and securing the harrow section 14 the implement may be used as a roller and drag and by attaching the draft animals to the rear ends of the runners 1 and elevating the plates 7 the implement may be used as a roller, harrow and pulverizer.

Having described my invention what I claim as new and desire to secure by Letters-Patent is:—

1. An implement of the character indicated comprising runners, a vertically adjustable plate located at the ends of the runners and lying in an inclined plane, a plate pivoted between the opposite ends of the runners and a roller journaled to the runners and located between said plates.

2. An implement of the character indicated comprising runners, a plate attached to one end thereof and being located in an inclined position, a plate pivoted between the opposite ends of the runners, a roller located between said plates and journaled to the runners, links pivoted to the plate, a harrow section attached to the links and being located between the roller and the pivoted plate, and a lever mechanism for elevating the harrow section.

In testimony that I claim the foregoing as my own, I have hereto affixed my signature in the presence of two witnesses.

DORAS W. DAVIS.

Witnesses:
H. D. CROSBY,
EVA HESSEL.